(No Model.) 2 Sheets—Sheet 1.
P. B. CLARKE.
AUTOMATIC SCALE FOR MEASURING MATERIAL IN BULK.
No. 601,997. Patented Apr. 5, 1898.
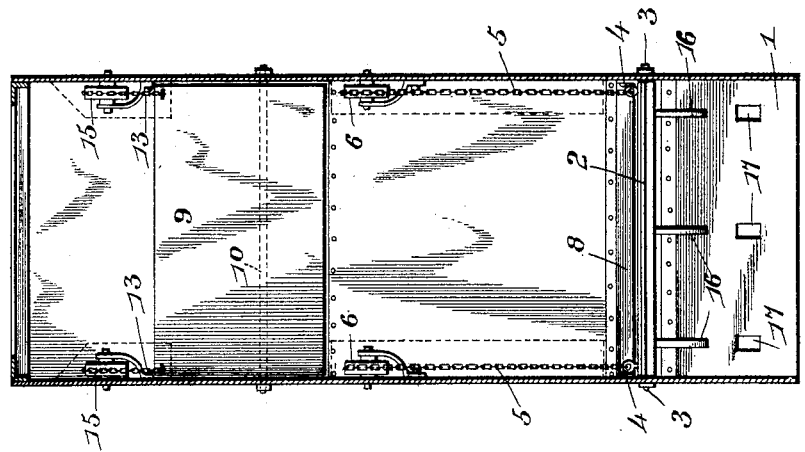
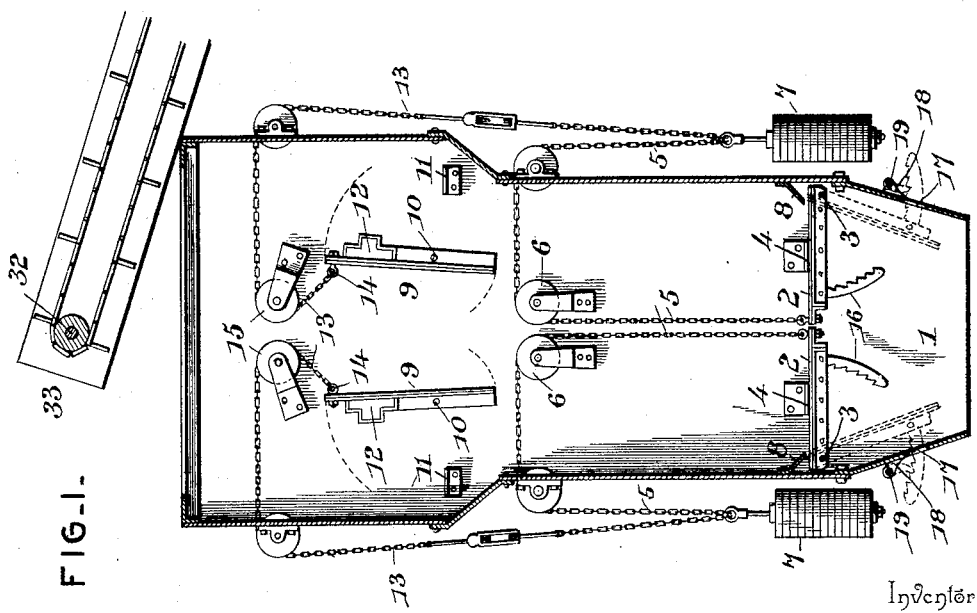
Witnesses
Jas. K. McCathran
J. F. F. Riley
Inventor
Peete B. Clarke
By his Attorneys,
C. A. Snow & Co.
THE NORRIS PETERS CO., PHOTO-LITHO., WASHINGTON, D. C.

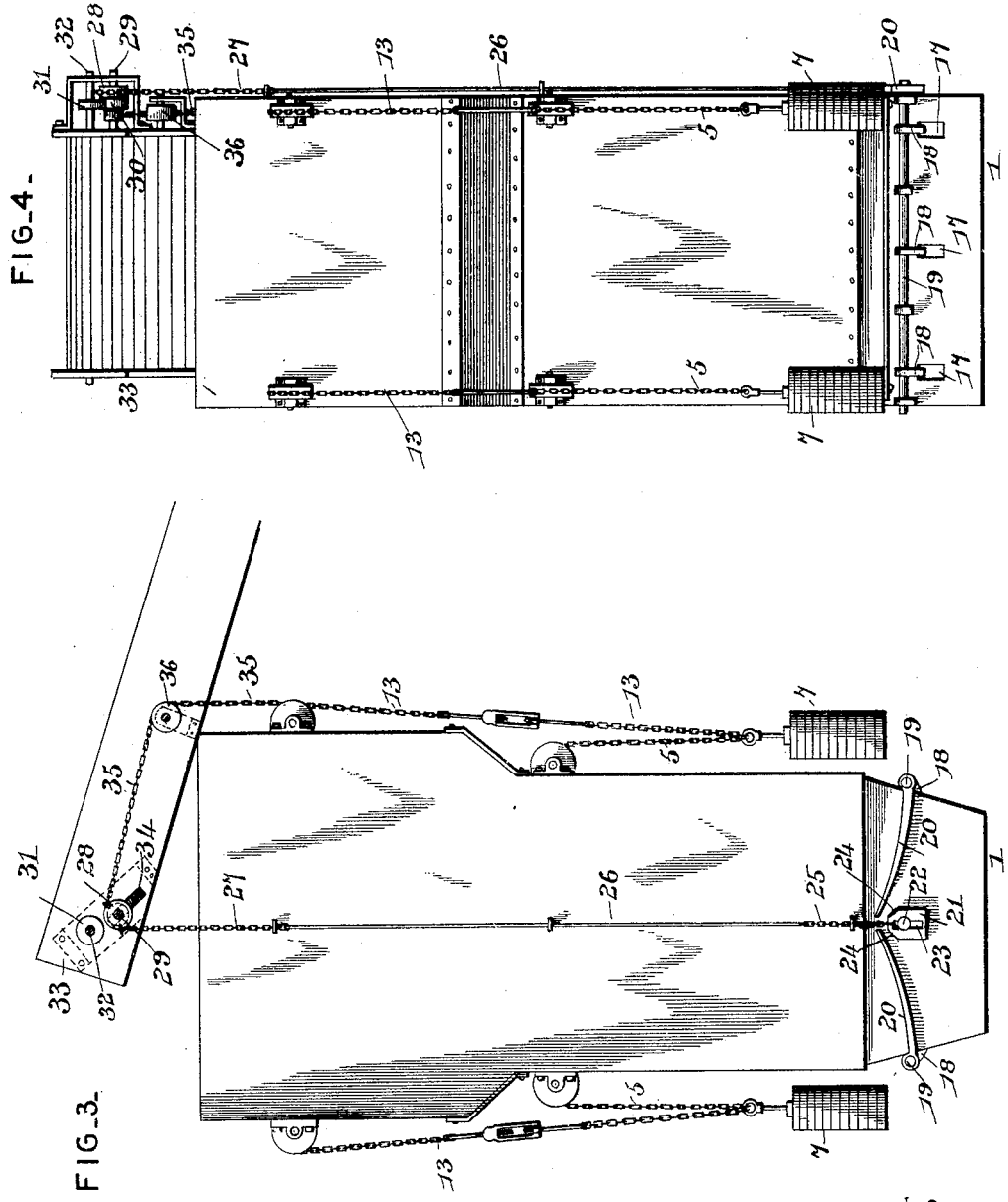

UNITED STATES PATENT OFFICE.

PEETE B. CLARKE, OF MOBILE, ALABAMA.

AUTOMATIC SCALE FOR MEASURING MATERIAL IN BULK.

SPECIFICATION forming part of Letters Patent No. 601,997, dated April 5, 1898.

Application filed May 20, 1895. Renewed September 17, 1897. Serial No. 652,075. (No model.)

*To all whom it may concern:*

Be it known that I, PEETE B. CLARKE, a citizen of the United States, residing at Mobile, in the county of Mobile and State of Alabama, have invented new and useful Automatic Scales for Measuring Material in Bulk, of which the following is a specification.

The invention relates to improvements in automatic scales for measuring material in bulk.

The object of the present invention is to provide a simple and efficient apparatus for automatically weighing coal or other material in bulk while the same is being delivered through a conveyer into the hold of a vessel, car, or other receptacle for shipment in order that an accurate record may be obtained of the exact quantity of coal or other material being shipped.

Another object of the invention is to provide such an apparatus which may be readily employed in mines or any other place where coal or any other material is handled in bulk and where it is desirable to keep an exact record of the quantity of material handled.

The invention consists in the construction and novel combination and arrangement of parts hereinafter fully described, illustrated in the accompanying drawings, and pointed out in the claims hereto appended.

In the drawings, Figure 1 is a vertical sectional view of automatic scales constructed in accordance with this invention. Fig. 2 is a similar view taken at right angles to Fig. 1. Fig. 3 is a side elevation. Fig. 4 is an end elevation.

Like numerals of reference indicate corresponding parts in all the figures of the drawings.

1 designates an elongated scale-chute constructed of sheet metal of suitable thickness or other material and having inclosing sides forming an approximately rectangular chute open at its upper end for the reception of the coal or other material to be handled and also open at its lower end for the discharge thereof. The elongated scale-chute is adapted to be suspended by chains or other suitable devices beneath the discharge end of a conveyer in order that all the discharge coal or other material must pass through it before entering the hold of a vessel, car, or other receptacle and must therefore pass through the grain devices contained within the chute 1. The chute 1 may also be arranged in a mine or at any other place where material is handled in bulk.

The elongated metallic scale-chute 1 is slightly enlarged at its upper receiving end for the reception of the material from the conveyer or the like, while within the same and near its lower reduced end are located pivoted scale-gates 2. The scale-gates 2 are pivoted at their outer ends 3 near opposite sides of the scale-chute and have their inner adjacent ends working contiguous to each other and adapted to move downward on the arc indicated in dotted lines in Fig. 1 of the accompanying drawings in order to allow the material to pass downward between them and to be discharged after accumulating in determined quantities.

The upward movement of the scale-gates 2 is limited by stop lugs or plates 4, secured to opposite sides of the chute 1 above the gates and serving to stop the latter in an alined horizontal position, so as to close the chute to the discharge of the material and in order to allow for the accumulation of a regulated amount of coal or other material thereon. The scale-gates are supported in such horizontal position by means of suspension-chains 5, secured at their inner ends to the gates and passing over suitable guide-pulleys 6 and connected at their outer ends to opposite pairs of weights 7. The guide-pulleys 6 are located above the scale-gates and are mounted in suitable bearings within the chute, and may, if desired, be protected by suitable shields from the descending material.

The weights 7 are regulated or adjusted so as to cause a given quantity of material to dump the gates and thereby insure an automatic weighing of the material. Assuming the four weights 7 to be about one hundred and twenty-five pounds each, when approximately five hundred pounds of coal or other material has fallen upon the gates the latter are necessarily overbalanced, so as to dump and discharge the coal or other material through the bottom of the chute to its point of dump. After the gates 2 have been relieved of their load or charge the weights 7 fall and return the gates to their normal horizontal position.

Inclined fenders 8 are secured to opposite sides of the scale-chute and project over the outer pivoted ends of the scale-gates 2 in order to prevent any loose coal or dirt from working around the joint and jamming the gates.

Arranged in the upper enlarged end of the scale-chute are pivoted cut-off gates 9. The cut-off gates 9 are pivoted at points intermediate of their ends, as at 10, to opposite sides of the scale-chute 1 and are adapted, when closed in their horizontal position, to rest on stop-plates 11, secured to opposite sides of the scale-chute and located on the inner faces of the same. The gates 9 are provided on their under sides with adjustable counter-weights 12, by means of which the operation of the gates may be accurately regulated. Chains 13 are attached at one end at 14 to the outer swinging ends of the gates 9 and pass over guide-pulleys 15, located within the chute at opposite sides thereof, and the outer terminals of the chains are connected to the weights 7.

When the gates 2 begin to dump, the weights 7 will rise and slacken the chains 13, which allow, when thus operated, the upper cut-off gates to close, and thus cut off the supply until the first discharge has passed through the scale-gates 2. Then the scale-gates 2, being deprived of their load, are closed by the falling of the weights 7, which now draw on the chains 13 and cause the cut-off gates 9 to dump in their turn any coal which may have fallen into the chute while the scale-gates 2 were being dumped. By this operation every charge of coal or other material is dumped in its turn, each charge representing so many pounds, a record of which may be kept by any suitable means.

In order to insure perfect operation of the pivoted scale-gates 2 and to prevent their closing before the entire charge of material has gone through the lower end of the chute, curved ratchet-bars 16 are secured to and depend from the inner ends of the scale-gates, and when the latter open the ratchet-bars 16 protrude through slots or openings 17 of opposite sides or ends of the reduced portion at the bottom of the chute and are automatically engaged by pawls 18. The pawls 18 are located on the exterior of the chute and are carried by rock-shafts 19, journaled in suitable bearings, and provided with arms 20, and the latter are slightly curved and extend inward on the outer face of one side of the chute and have sufficient weight to hold the pawls normally in position to engage the teeth of the ratchet-bars to lock the scale-gates in an open position. It requires only a short space of time for the scale-gates to discharge the material accumulated upon them, and the pawls 18 are automatically released from their engagement with the ratchet-bars 16 by a slide mounted on the exterior of the chute and located beneath the adjacent ends of the arms 20, which extend nearly half-way across the chute. The slide 21 is adapted to move upward and engage the inner terminals of the arms 20 of the rock-shafts to effect such disengagement, and it is limited in its vertical movement by a fastening device 22, mounted on the chute and located in a vertical slot 23 of the slide 21. The upper end of the slide is tapered or oppositely beveled at 24 in order to spread and swing the arms 20 to effect a corresponding inward swinging of the pawl, and the slide is connected by a short chain 25 with a rod 26, which is disposed vertically and has its upper end attached to a chain 27, depending from a pulley or drum 28 and adapted to be wound around the same to move the slide 21 upward to partially rotate the rock-shafts and release the scale-gates.

The pulley or drum 28 is mounted on a shaft 29, which also carries a wheel 30, adapted to contact and mesh with a corresponding wheel 31 of a conveyer-shaft 32 of a delivery-chute 33; but when the scale-chute is used in connection with any other source of supply other than a conveyer other means may be employed for rotating the wheel 31 for the purposes hereinafter described. The shaft is slidingly mounted in suitable bearings and is engaged by a spring 34, which, when free to operate, moves the shaft upward and carries the wheel 30 into engagement or mesh with the continuously-rotating wheel 31, and the shaft 29 is also connected by a chain 35 with the weight-chains 13 of the cut-off gates. The chain 35 passes over a pulley 36 and depends therefrom to the weight-chain 13, and when the weights move upward by reason of the dumping of the scale-gates the chain 35 is slackened and permits the spring 34 to throw the wheel 30 into engagement with the continuously-rotating wheel 31. This effects a rotation of the shaft 29 and a consequent rotation of the pulley or drum 28, whereby the chain 27, which is attached to the pulley or drum, is wound thereon, and the slide 21 is moved upward. The length of the connections between the pulley or drum 28 and the slide 21 is such as to require in winding for disengaging the gates 2 a time sufficient to allow the scale-gates to discharge entirely their load. As soon as the gates are thus automatically released the weights operate to close them instantly, and this operation carries the shaft 29 back and throws the wheel 30 out of engagement with the wheel 31. The wheels 30 and 31 may be sprocket-wheels or may simply frictionally engage each other and have smooth peripheries, and the weight of the slide 21 is sufficient to unwind the chain 27 from the drum or pulley 28 and to descend to its initial position, ready to be again operated by the dumping of the gates 2. The wheel 30 is thus intermittently rotated and the locking device for holding the gate open is tripped to release the gate, and the entire operation is automatic.

It will be seen that the scale-chute and the weighing devices are simple and comparatively inexpensive in construction, that they possess the necessary strength and durability for adapting them for weighing coal or any other material handled in bulk, and that the weighing apparatus is automatic in its operation. It will also be apparent that the scale-gates, upon which the charge accumulates, are automatically retained in their open position to permit the material to be dumped completely and are similarly released after the operation of dumping has been completed.

Changes in the form, proportion, and the minor details of construction may be resorted to without departing from the principle or sacrificing any of the advantages of this invention.

What I claim is—

1. In an apparatus of the class described, the combination of a scale-chute, a scale-gate hingedly mounted in the chute and arranged to swing downward in opening, a pivotally-mounted cut-off gate arranged in the chute and located above the scale-gate and provided with a weight for closing it, a weight 7, a chain or cable having one end connected to the weight, and its other end connected with the scale-gate, and a cable or chain 13 having one end attached to the cut-off gate and the other end attached to the weight 7, and capable of holding the cut-off gate open when the scale-gate is closed and adapted to be slackened when the weight 7 rises through the opening of the scale-gate, whereby the cut-off gate is permitted to close automatically, substantially as described.

2. In an apparatus of the class described, the combination of a scale-chute, scale-gates hinged at their outer ends to the chute and located within the same, weights located outside of the chute, the chains 5 having their outer ends attached to said weights, and their inner ends secured to the free ends of the scale-gates and passing over guide-pulleys located above the gates, the cut-off gates arranged within the chute and pivoted intermediate of their ends and provided with counterweights for closing them, and the chains 13 connected with the cut-off gates and passing over suitable guide-pulleys, and connected with the first-mentioned weights, substantially as and for the purpose described.

3. In an apparatus of the class described, the combination of a scale-chute, hingedly-mounted scale-gates arranged within the chute and connected at their outer ends with the same, ratchet-bars mounted on the free ends of the scale-gates, pawls mounted in the chute and arranged to engage the ratchet-bars automatically for locking the scale-gates in their open position, weights connected with the scale-gates for holding the same normally in a horizontal position, and connections between the weights and the pawls, whereby the latter are disengaged from the ratchet-bars after a limited engagement, substantially as described.

4. In an apparatus of the class described, the combination of a scale-chute, the hingedly-mounted downwardly-swinging scale-gates arranged within the chute, weights connected with the scale-gates for holding the same normally closed, ratchet-bars depending from the scale-gates, rock-shafts provided with pawls to engage the ratchet-bars and having arms, a slide arranged beneath and adapted to engage the arms of the rock-shafts to release the gates, mechanism for actuating the slide, and connections between the weights and such actuating mechanism, whereby the latter is set in operation when the gates are opened, substantially as described.

5. In an apparatus of the class described, the combination of a scale-chute, swinging gates arranged within the same, weights connected with the gates for holding the same normally closed, ratchets carried by the gates, pawls mounted on the chute for engaging the ratchet-bar for holding the gates open, a continuously-rotating wheel, a shaft carrying a wheel and capable of a limited movement for enabling its wheel to be carried into and out of engagement with the continuously-rotating wheel, a pulley or drum mounted on the shaft, a chain secured to and adapted to be wound around the drum and connected with the pawls and adapted to withdraw the same from their engagement, and connections between the shaft and the weights, whereby the said wheels are caused to engage or mesh with each other when the gates are opened, substantially as described.

6. In an apparatus of the class described, the combination of a scale-chute, hingedly-mounted gates arranged within the chute, weights connected with the gates for holding the same normally closed, ratchets carried by the gates, pawls mounted on the chute for engaging the ratchets, rock-shafts carrying said pawls and provided with arms, a slide having a limited movement and arranged to engage the arms, a continuously-rotating wheel, a shaft carrying a wheel for meshing or engaging with the continuously-rotating wheel and provided with a pulley or drum, a spring connected with the shaft and adapted to hold the said wheels in engagement, a chain secured to the pulley or drum and adapted to be wound thereon and connected with said slide, and connections between the shaft and the weights, whereby the spring is permitted to engage the said wheels, substantially as described.

7. In an apparatus of the class described, the combination of a scale-chute, scale-gates arranged within the chute and hinged at their outer ends to the same, rack-bars depending from the free inner ends of the scale-gates, pawls mounted on the chute and located below the hinges of the scale-gate and arranged to engage the rack-bars automatically for locking the scale-gates in their open position, weights connected with the scale-gates for holding the same normally closed, and means for disengaging the pawls from the rack-bars to permit the weights to close the gates, substantially as described.

8. In an apparatus of the class described, the combination of a scale-chute, a conveyer provided with a continuously-rotating wheel, a scale-gate arranged within the chute, a locking device for holding the scale-gate in its open position, a wheel intermittently contacting with the continuously-rotating wheel and operated by the same, a cable or chain connected at one end with the intermittently-rotating wheel and adapted to be wound up by the same, and having its outer end connected with the locking device, whereby the latter is tripped to release the gate, and means for moving the intermittently-rotating wheel into and out of contact with the continuously-rotating wheel, substantially as described.

9. In an apparatus of the class described, the combination of a scale-chute, a scale-gate hinged in the chute, a locking device for holding the scale-gate open, a weight connected with the scale-gate and adapted to close the same, a continuously-rotating wheel, an intermittently-rotating wheel adapted to be moved into and out of contact with the continuously-rotating wheel, a chain or cable connected at one end with the intermittently-rotating wheel and adapted to be wound by the same, and having its other end connected with the locking device and adapted to trip the same to release the gate, and connections between the weight and the intermittently-rotating wheel, whereby the latter is moved into and out of contact with the continuously-rotating wheel when the gate is open and is drawn out of contact when the gate is closed, substantially as described.

In testimony that I claim the foregoing as my own I have hereto affixed my signature in the presence of two witnesses.

PEETE B. CLARKE.

Witnesses:
H. L. GRIFFING,
WALTER GREYSON HORN.